Figure 11:
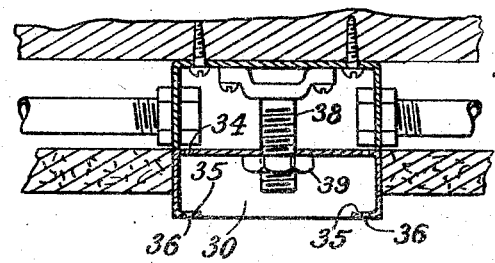

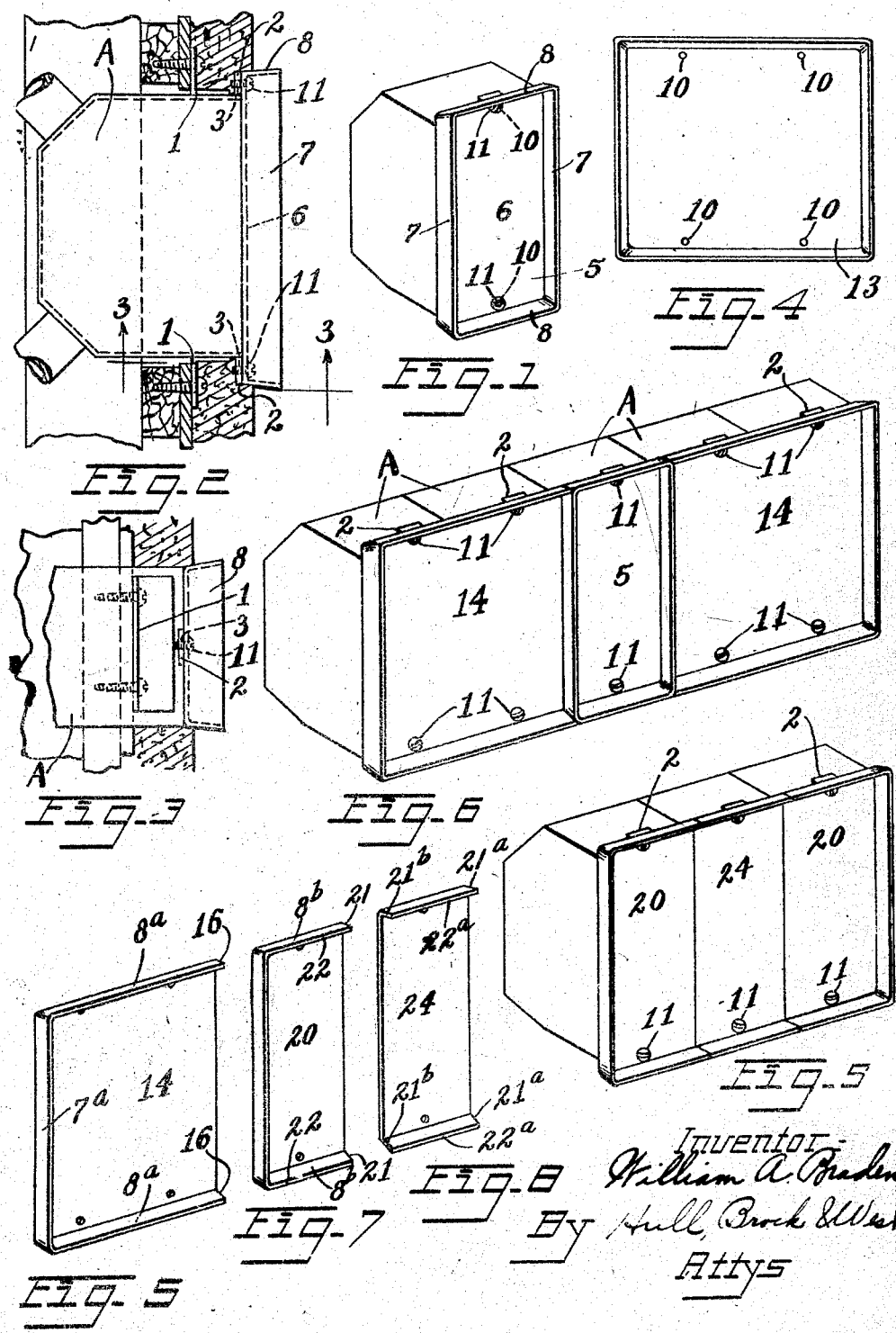

Aug. 25, 1925.  
W. A. BRADEN  
1,550,870  
COVERING MEANS FOR OUTLET BOXES  
Filed Nov. 19, 1921  2 Sheets-Sheet 2

Inventor:
William A. Braden
By Hull, Brock & West
Attys

Patented Aug. 25, 1925.

1,550,870

UNITED STATES PATENT OFFICE.

WILLIAM A. BRADEN, OF CLEVELAND, OHIO, ASSIGNOR OF FORTY-FIVE ONE-HUNDREDTHS TO DAVID E. YATES AND TEN ONE-HUNDREDTHS TO ARTHUR M. HAHN, BOTH OF CLEVELAND, OHIO.

COVERING MEANS FOR OUTLET BOXES.

Application filed November 19, 1921. Serial No. 516,324.

*To all whom it may concern:*

Be it known that I, WILLIAM A. BRADEN, a citizen of the United States, residing at Cleveland, in the county of Cuyahoga and State of Ohio, have invented a certain new and useful Improvement in Covering Means for Outlet Boxes, of which the following is a full, clear, and exact description, reference being had to the accompanying drawings.

This invention relates to electrical outlet boxes and has particular reference to a temporary covering means for such boxes.

Electrical outlet boxes are placed in buildings during the course of construction, before the walls and ceilings are plastered so that when such plastering is finished, the front edges of these boxes will be flush or slightly below the surface of the plaster. This is necessary in order to produce a neat appearance about the attachment which is fastened to, or positioned over the box after the plastering operation is completed. It is obvious that while the ceilings and walls are being plastered, these boxes become more or less filled with plaster and in some instances are buried completely so that when the electrician returns to install the fixtures or other attachments, it is often necessary for him to lose considerable time excavating plaster before he can begin his actual work of pulling the wires and completing the installation of the attachments. The excavating of this plaster and the subsequent pulling of wires into the box not only causes a large amount of dirt and grit on the floors which are usually being finished or have been finished by this time, but such excavation and pulling of wires also often results in marring the plaster about the box to such an extent that it is necessary for the plasterer to return and replaster the damaged surface. The Underwriters' regulations provide that no wires can be pulled into an open box, hence the electrician cannot pull the wires until the plastering has been completed and he is ready to fasten the attachment to the box.

Furthermore the moisture in the plaster rusts the screw threads in the small holes in the box, which serve as a fastening means for the attachment, to such an extent that the fixture attaching screws are often twisted off which means an added loss of time to bore and retap the hole. If the screws are left in the box during the plastering operation they are often lost, or cut off, or badly bent by the plasterer's trowel striking them, all of which delays the electrician and prevents proper progress with the work.

In present practice these boxes remain open for several days from the time of their installation until the plastering is complete and is hard and dry. During this time the building is often visited by children, hostile persons and other miscreants who seek to hinder the work by dropping marbles, tacks and other missiles into the conduits which sometimes may be removed after indefinite delays but often results in tearing the entire conduit out of the plastered wall and replacing it, thus causing a large loss of time and heavy expenditure for the electrical work.

It is the general object of the present invention to provide a temporary covering means for these outlet boxes which may be easily and quickly attached to the boxes as soon as they are installed and when attached shall project beyond the finished plastered surface so that the plaster will be molded neatly about the box and also prevented from entering said box during the plastering operation.

Another object is to provide a cover of the aforesaid character which may be fastened to the box, with the usual fixture attaching screws provided with the box, in such manner that said screws are protected from injury by the plasterer's trowel and the screw holes in the box are protected from rust.

Another object is to provide a cover which shall completely close the outlet box in compliance with the Underwriters' regulations and hence permit the wires to be drawn into the box immediately after their installation and before the plastering takes place, thus avoiding the possibility of marring the plaster afterward and the filling of the conduits with obstructions as previously pointed out.

A further object is to provide a cover of this character which shall be exceedingly simple in construction, inexpensive to manufacture and which shall require a minimum time to attach or remove from the box.

With these and other objects in view, the invention consists in the various novel features of construction and combination all of which will be fully described hereinafter and pointed out in the appended claims.

Figure 12:
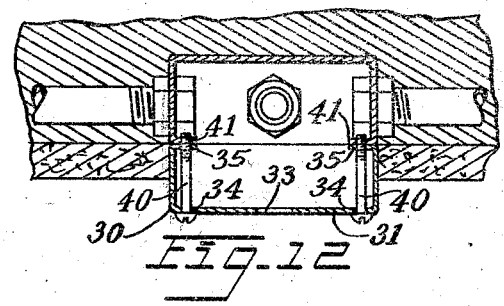
Figure 14:
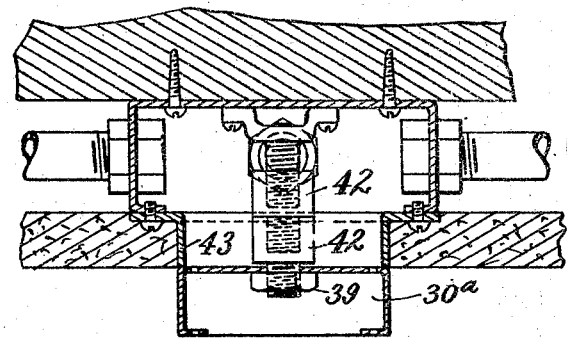
Figure 16:
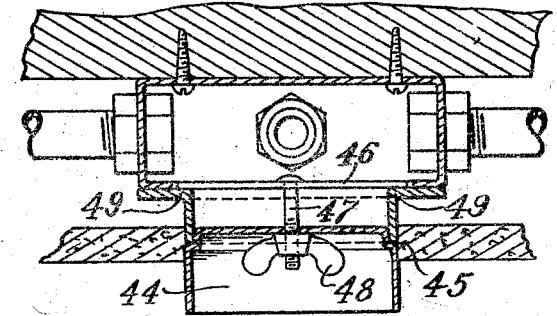
Figure 13:
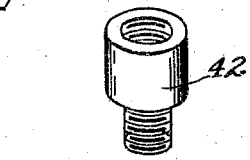
Figure 10:
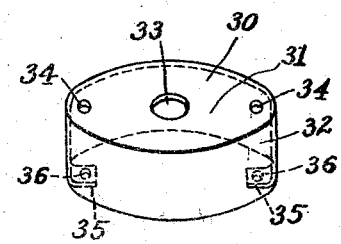
Figure 15:
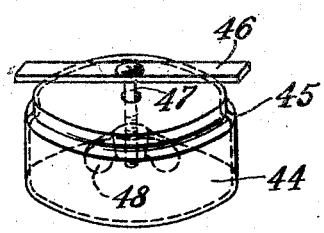

In the accompanying drawings wherein I have shown certain illustrative embodiments of my invention but without intent to limit myself thereto, Fig. 1 is a perspective view of a switch outlet box fitted with a cover plate constructed in accordance with my invention; Fig. 2 is a sectional view through a wall showing a switch outlet box and cover attached thereto in elevation; Fig. 3 is a sectional view taken on the line 3—3 of Fig. 2; Figs. 4 and 5 are respectively a front elevation and a perspective view each showing a modified form of cover; Fig. 6 is a perspective view of a five gang switch outlet box fitted with temporary covers; Figs. 7 and 8 are perspective views each illustrating a further modification; Fig. 9 is a perspective view of a three gang switch outlet box fitted with the covers shown in Figs. 7 and 8; Fig. 10 is a perspective view of a cover for use in connection with ceiling type outlet boxes; Figs. 11 and 12 are vertical sectional views of a ceiling outlet box fitted with temporary covers; Fig. 13 is a perspective view of an extension used in some instances with my temporary cover; Fig. 14 is a sectional view of a modified form of outlet box with cover attached; Fig. 15 is a perspective view illustrating a further modified form of cover; and Fig. 16 is a sectional view of a ceiling outlet box fitted with the cover illustrated in Fig. 15.

Describing the various parts by reference characters, and referring particularly to Figs. 1–9 inclusive, A indicates a wall switch box of the usual or any approved construction which is fastened in the wall by a pair of brackets indicated at 1. A pair of opposed front edges of these boxes are usually provided each with an ear 2 in which a threaded aperture 3 is formed so that a finishing plate, not shown, may be secured thereto by suitable screws in the usual manner.

In carrying out my invention with an outlet box for this general type I provide a cover 5 formed from sheet metal and provided with a bottom 6 which has side walls 7 and end walls 8 projecting therefrom. The bottom 6 is preferably formed with a length substantially equal to the distance between the outer edges of ears 2 and with a width substantially equal to the width of the box. The side and end walls 7 and 8 respectively, project upwardly from the sides and ends of the bottom and these walls are preferably flared outwardly slightly so as to facilitate the withdrawal of the cover from the plastered wall. The bottom 6 is provided with apertures 10 in alignment with the apertures 3 formed in the ears of the box so that the usual attaching screws 11 provided with the box may be used to fasten the cover to the box as shown in Figs. 1–3 inclusive.

In Fig. 4 I have shown a cover 13 for a two gang switch box which is substantially the same as a single switch outlet box cover except that the width of this cover is equal to the width of a two gang box and said cover is also formed with four apertures 10 to receive the fastening screws of each switch box.

In Fig. 5 I have shown a third type of cover 14 which is used in connection with a single or double cover or a combination of both to provide a cover for a multiple gang switch box. This third type of cover is similar to a two gang switch cover except that one side is omitted and the end edges 16 of walls 8$^a$ are formed parallel to the remaining side wall 7$^a$. In use, for a five gang switch box such as is shown in Fig. 6 a cover 14 is fastened over each end pair of switch boxes and a single cover 5 is inserted intermediate said end covers and fastened with the usual screws provided. It is obvious that a three gang switch cover could be formed with a single cover 5 and a cover 14; a four gang switch cover with a cover 13 and a cover 14; a six gang cover with two covers 14 and a double cover 13; and so on for any multiple gang switch.

Referring now to Figs. 7–9 inclusive it will be seen that I have shown certain modified forms of multiple type switch covers. In Fig. 7 I have shown a single type cover 20 having one side wall omitted and having the end edges 21 of walls 8$^b$ formed at substantially right angles to the front edges 22 of said walls.

In Fig. 8 I have shown a single type of cover 24 having both side walls omitted and having the end edges 21$^a$ and 21$^b$ formed at substantially right angles to the front edges 22$^a$ of said end walls.

In forming a multiple gang switch closure with these covers, a double cover is formed by using two covers 20 placed with their open sides abutting, and each fastened with the usual attaching screws as before; a three gang switch cover is formed by attaching a cover 20 to each end box and a cover 24 intermediate such end covers, as shown in Fig. 9. For larger gang switch boxes, as many of covers 24 as desired may be placed between the end covers 20, 20. It will of course be understood that a single switch outlet box is closed with a cover 5 as shown in Fig. 1.

Referring to Figs. 10–16 it will be seen that I have shown various types of closures for celing type outlet boxes. In Fig. 10 I have shown a cover 30 which is circular in shape and having a bottom 31 and a cylindrical wall 32 projecting at substantially right angles therefrom. The bottom 31 is formed with a central aperture 33 and two diametrically spaced apertures 34. The outer peripheral edge of the wall 32 is provided with inwardly directed ears 35 which are formed with apertures 36 and these apertures are disposed in alignment with apertures 34. In some instances the ceiling outlet box is provided with a fixture stud 38 only, and in this event the cover 30 may be fastened as shown in Fig. 11 by threading a nut 39 on the end of stud 38 which projects through central aperture 33 of the cover. If a large number of wires are disposed within the outlet box it might be desirable to invert the cover 30 so that its open peripheral edge will abut the peripheral edge of the outlet box as shown in Fig. 12. In this event the cover 30 may be fastened either by use of screws 40 passed through apertures 34 and 36 and threaded into the ears 41 of the outlet box, or if the box is not provided with these ears, then the cover may be fastened to the fixture stud as previously described, using a nipple extension 42 such as shown in Fig. 13 to lengthen such stud if necessary.

In Fig. 14 I have shown a cover 30ª which is identical with cover 30 except that it is smaller in diameter to fit the fixture ring 43 which is sometimes fastened to the outlet box. This cover 30ª may be fastened as described in connection with cover 30.

In Figs. 15 and 16 I have shown a modified form of cover 44 which is formed with a shoulder 45 to engage the peripheral edge of the box and center the cover. This type of cover may be fastened by the usual screws or a modified form of fastening may be employed which consists of bar 46 swivelled or loosely connected to the head of a bolt 47. This bolt projects through the cover and has a wing nut 48 threaded on the end thereof. In applying this cover, the bar 46 is placed in the outlet box so as to straddle the shoulder 49 therein and the wing nut is then tightened to draw the cover snugly into contact with the outlet box.

In use, the outlet boxes and conduits will be installed in the building in the usual manner, and as soon as such installation is completed, the wires may be pulled into the boxes and the covers applied as previously described. These covers seal or close the box and hence allow the wires to be pulled, as such is in accordance with the Underwriters' regulations. The plastering may proceed in the usual manner and the interior of the boxes as well as the screw threaded portions thereof and the wires therein will be fully protected from the plaster.

The boxes will be closed to miscreants during the time the plaster is drying and if the covers were removed, it would be impossible to drop obstructions into the conduits as the wires have been pulled and practically close them.

When the plaster is dry, and the electrician returns to install the fixtures, it is only necessary for him to remove the covers and install the fixtures which can be done immediately as it will not be necessary to clean the plaster out of the box and mar the finished plaster by pulling wires. The covers may be used indefinitely as they do not form a part of the finished outlet and fixture.

Having thus described my invention, what I claim is:

1. As a new article of manufacture, a temporary cover for an electrical outlet box having a plate adapted to close said box, side walls extending from said plate and adapted to project beyond the finished plastered surface about said box, and means for fastening said cover to the box.

2. The combination with an electrical outlet box having an open front, of a temporary cover adapted to be positioned over said open front and close the same, said cover being composed of a plate and walls extending therefrom, said walls being of a depth sufficient to project beyond the finished plastered surface about said box, and means for fastening said cover to said box.

3. The combination with an electrical outlet box having an open front, of a temporary cover adapted to be positioned over said open front and close the same, said cover being provided with a plate and walls projecting therefrom, said walls being adapted to project beyond the finished plastered surface about said box, and means associated with said cover whereby the usual fixture fastening means provided with said box may be used to retain said cover in position.

4. The combination with an electrical outlet box having an open front and an ear projecting from opposed sides of said box, said ears each having an aperture therein, a temporary cover adapted to be positioned over said open front and close the same, said cover being provided with a surface having apertures therein in alignment with the apertures in said ears, walls extending from said cover and adapted to project beyond the finished plastered surface about said box, and means adapted to enter said aligning apertures to retain said cover in position.

5. The combination with an electrical outlet box having a substantially rectangular open front, of a temporary cover adapted to be positioned over said open front and close the same, said cover being provided with a substantially rectangular bottom plate and side walls extending from at least two edges of said bottom plates, said walls being adapted to project beyond the finished plastered surface about said box, and means for retaining said cover in position.

6. The combination with an electrical outlet box having a substantially rectangular open front and an ear projecting from opposed sides of said box, said ears each having an aperture therein, a temporary cover adapted to be positioned over said open front and close the same, said cover being provided with a substantially rectangular plate having apertures therein in alignment with the apertures in said ears, said plate having a width substantially equal to the width of the opening defined by a pair of opposed edges of said box, said plate having a length greater than the opening defined by the other pair of opposed edges of said box, and walls extending from said plate adapted to project beyond the finished plastered surface about said box.

7. The combination with an electrical outlet box having an open front and ears projecting from the sides of said box, said ears each having a threaded aperture therein, of a temporary cover adapted to be positioned over said open front and close the same, said cover being provided with a surface having apertures therein in alignment with the apertures in said ears thereby to permit the usual fixture fastening screws to be used to retain said cover in position, and side walls extending from said cover, said side walls being adapted to project beyond the finished plastered surface about said box and beyond said fastening screws.

In testimony whereof, I hereunto affix my signature.

WILLIAM A. BRADEN.